United States Patent
Itoh et al.

(10) Patent No.: US 7,816,877 B2
(45) Date of Patent: Oct. 19, 2010

(54) BRAKE-CONTROLLABLE BRUSHLESS MOTOR

(75) Inventors: Kazuo Itoh, Kasai (JP); Toshiyuki Tachibana, Himeji (JP); Mitsuo Inoue, Hyogo (JP)

(73) Assignee: Itoh Denki Co., Ltd. (JP)

( * ) Notice: Subject to any disclaimer, the term of this patent is extended or adjusted under 35 U.S.C. 154(b) by 382 days.

(21) Appl. No.: 12/075,489

(22) Filed: Mar. 12, 2008

(65) Prior Publication Data

US 2008/0224640 A1 Sep. 18, 2008

(30) Foreign Application Priority Data

Mar. 13, 2007 (JP) .............................. 2007-064037

(51) Int. Cl.
 *H02P 1/04* (2006.01)
(52) U.S. Cl. .............................. 318/400.09; 318/400.13; 318/400.1
(58) Field of Classification Search ............ 318/400.09, 318/400.13, 400.14, 400.1, 376
 See application file for complete search history.

(56) References Cited

U.S. PATENT DOCUMENTS 6,452,349 B1    9/2002    Hahn et al.

| | | |
|---|---|---|
| 2004/0183490 A1 | 9/2004 | Maeda |
| 2005/0024010 A1 | 2/2005 | Tachibana |
| 2008/0048598 A1* | 2/2008 | Shibuya .................. 318/400.1 |

FOREIGN PATENT DOCUMENTS

| | | |
|---|---|---|
| JP | 2004-190709 | 7/2004 |
| JP | 2007-020588 | 2/2007 |
| WO | WO 2005/119898 A2 | 12/2005 |

* cited by examiner

*Primary Examiner*—Karen Masih
(74) *Attorney, Agent, or Firm*—Wood, Phillips, Katz, Clark & Mortimer

(57) ABSTRACT

A brake-controllable brushless motor has a rotor and a stator having polyphase coils; a polar position detector whereby electric power is supplied to the coil selected by its phase in response to the polar positions of the rotor detected by the polar position detector; a driver division for controlling the electric supply to the coils; a motor pulse identifier for recognizing motor pulse signals fed from the polar position detector; and a delayed pulse generator for producing phase-delayed pulse signals in response to the pulse signals fed from the motor pulse identifier, thereby ensuring that when the brushless motor is braked, the phase delay of the delayed pulse signals is progressively and continuously enlarged, and that the coils receive a controlled electric supply from the driver division in response to the delayed pulse signals.

8 Claims, 9 Drawing Sheets

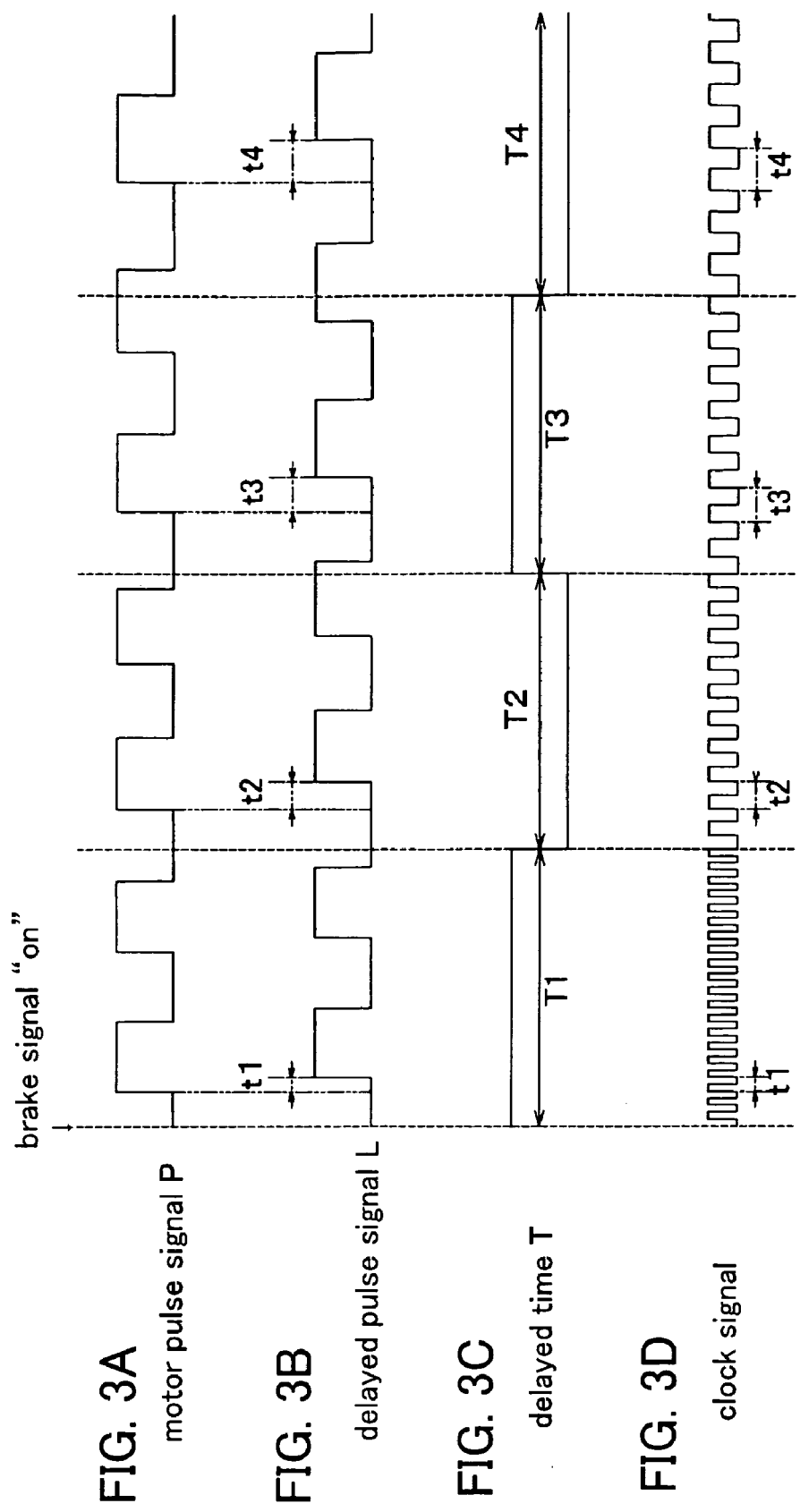

BRAKE-CONTROLLABLE BRUSHLESS MOTOR

TECHNICAL FIELD

The present invention relates to a brake-controllable brushless motor, and more particularly, to a brake-controllable brushless motor adapted for use in a device having a rotary member such as a rotary cutter in the grass mower and in the roller conveyor.

BACKGROUND ART

Brushless motors are widely used instead of brushed motors; for example, JP Laid-open Application No. 2007-20588 teaches that they are used in grass-mowers having a power-driven rotary cutter.

Another example is shown by JP Patent No. 3673923 which discloses a power-driven roller-conveyor and a power-driven winder for winding up a long object, such as paper, film or cloth. The roller conveyor must transport the cartons constantly kept upright to the delivery port, and the winder must roll up a long object constantly in a stretched manner.

However, the problem tends to arise from the inertia involved in the stoppage of the motor. The inertia is likely to loosen the fasteners in the rotary cutter, thereby releasing the rotary cutter from the body of the grass mower. This is very dangerous for the operator and people nearby. The same trouble occurs in the roller conveyor in that the cartons placed on the rollers fall down on the floor, thereby damaging the contents of the cartons. In the case of the winder the tensioned object detrimentally becomes loose.

Therefore, in those apparatus using rotary members such as rotary cutters and rollers it is required to stop the motors gradually so as to minimize the inertia.

The present invention is directed to solve the problems discussed above, and is to provide a brake-controllable brushless motor adapted for use in the apparatus having a power-driven rotary member.

SUMMARY OF THE INVENTION

A first version of a brake-controllable brushless motor has a rotor and a stator having polyphase coils; a polar position detector whereby electric power is supplied to the coil selected by its phase in response to the polar position of the rotor detected by the polar position detector; a driver division for controlling the electric supply to the coils; a motor pulse identifier 30 for recognizing motor pulse signals fed from the polar position detector; and a delayed pulse generator for producing phase-delayed pulse signals in response to the pulse signals fed from the motor pulse identifier 30, thereby ensuring that when the brushless motor is braked, the phasic delay of the delayed pulse signals is progressively and continuously enlarged, and the coils receive controlled electric supply from the driver division in response to the delayed pulse signals.

A second version of a brake-controllable brushless motor additionally includes a clock signal generator for producing a predetermined number of clock signals, whereby the delayed pulse generator produces delayed pulse signals whose phases are delayed for the motor pulses recognized by the motor pulse identifier 30, thereby ensuring that after the braking operation starts, the number of clock signals diminishes at every predetermined period of time A third version of a brake-controllable brushless motor additionally includes a chargeable battery for storing the electric power induced when the brushless motor is stopped A fourth version of a brake-controllable brushless motor, the rotor is mechanically connected to a rotating shaft adapted for connection to a rotary member, thereby ensuring that the rotation of the rotary member is gradually stopped in response to the braking control signal.

A fifth version of a brake-controllable brushless motor, the rotary member is a rotary cutter of a grass mower.

A sixth version of a brake-controllable brushless motor, the rotary member is a roller of the roller conveyor used for carrying cartons from one place to another.

A seventh version of a brake-controllable brushless motor, the brushless motor is built in a selected number of rollers as motorized rollers.

An eighth version of a brake-controllable brushless motor, the rotary member is a pair of rollers for supporting a sheet which is reciprocally moved from one roller to the other, thereby preventing inertia from occurring when the rollers are stopped

BRIEF DESCRIPTION OF THE DRAWINGS

FIG. 3A is a timing diagram showing a pattern of pulse signals recognized in the motor pulse recognizing division;

FIG. 3B is a timing diagram showing a pattern of delay pulses generated in the delay pulse division;

FIG. 3C is a timing diagram showing the advance of time-lag;

FIG. 3D is a timing diagram showing a pattern of clock signals;

DESCRIPTION OF THE PREFERRED EMBODIMENTS

Figure 1:
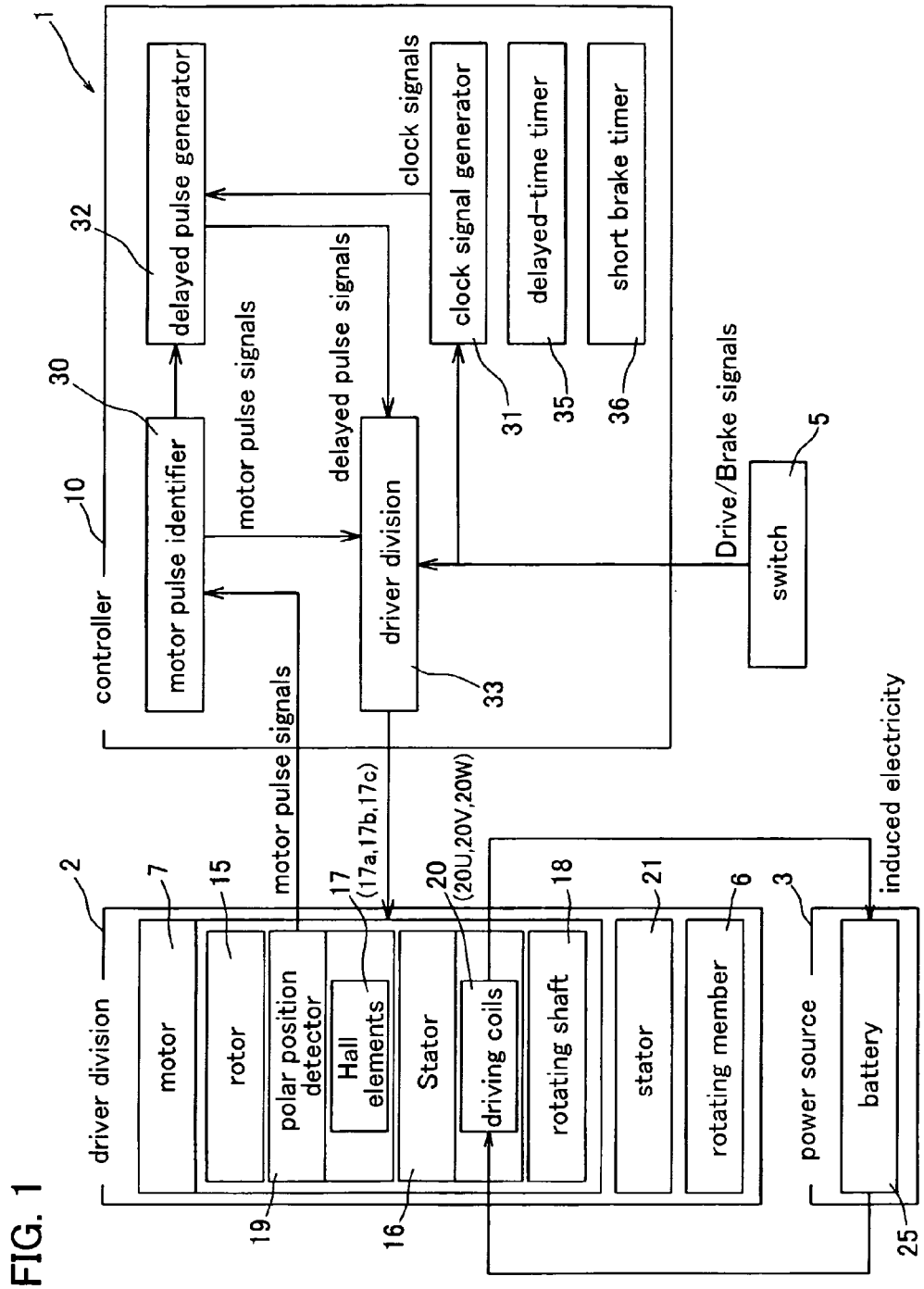
FIG. 1 is a block diagram diagrammatically illustrating the structure of a motor-driven grass mower embodying the present invention.
Figure 2:
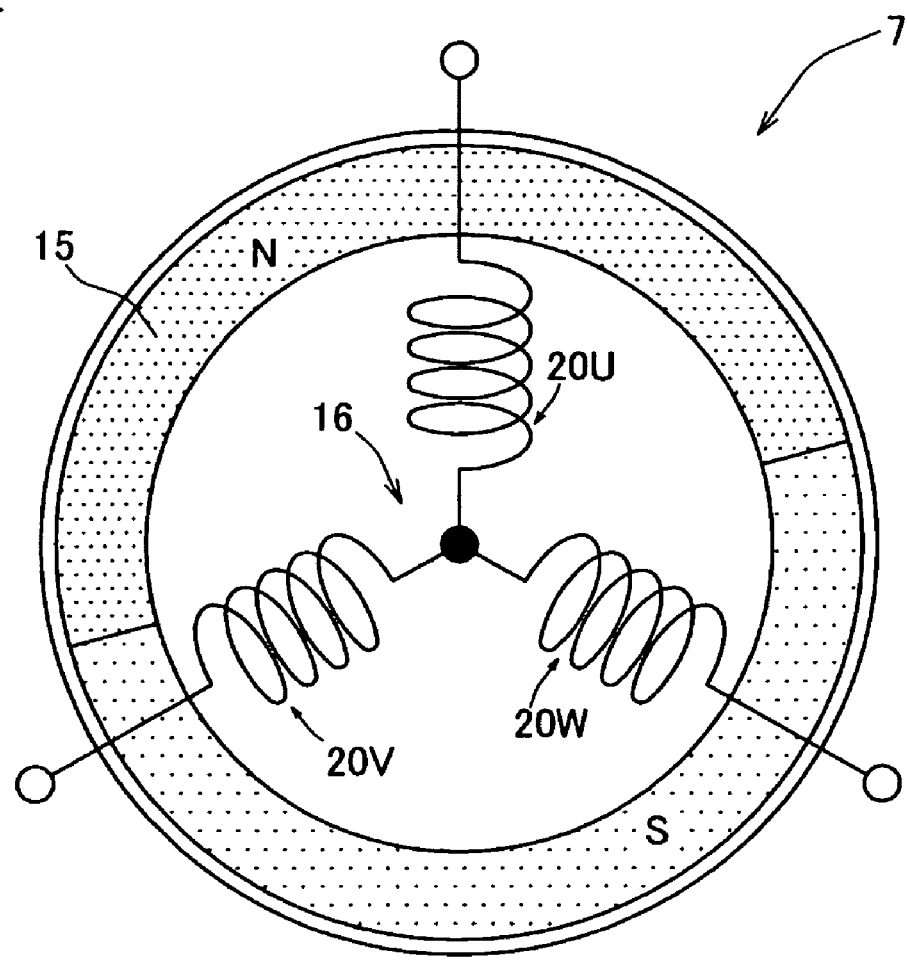
FIG. 2 is a schematic cross-section illustrating the internal structure of the motor.

Referring to FIG. 1, a brushless motor system 1 ("motor system 1") and a brushless motor brake-controller 10 ("controller 10") embodying the present invention will be described:

The motor system 1 includes a driver division 2, a power source 3, a switch 5 and the controller 10. The driver division 2 includes a brushless motor 7 ("motor 7") and a rotary member 6.

The motor 7 has a rotor 15, a stator 16 having polyphase coils, and Hall elements 17, wherein the rotor 15 is a bipolar (N-S) magnet and is rotatively connected to a rotating shaft 18 by means of one or more fasteners such as bolts and nuts. The stator 16 is provided with polyphone (n phases) coil 20, hereinafter called "coil 20U, 20V and 20W", respectively.

The Hall elements 17 are used to generate pulse signals by monitoring the poles of the rotor 15, thereby identifying the poles of the rotor 15 varying from time to time. In this embodiment three Hall elements 17a, 17b and 17c are located at 120° angular displacements. These three Hall elements 17a to 17c constitute a polar position detector 19.

Figure 4A:
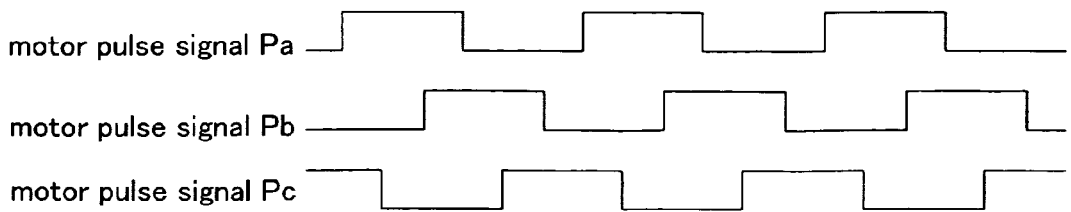
FIG. 4A is a timing diagram showing a pattern of pulses generated in the regular operation of the motor.

Referring to FIG. 4A the Hall elements 17a, 17b and 17c independently generate pulse signals Pa, Pb and Pc, respectively. As a result, the coil 20s are energized one by one in response to the pulse signals Pa, Pb and Pc, thereby causing the motor 7 to rotate the rotor 15 and the rotating shaft 18 in a desired direction. When the coils 20a are de-energized, the rotor 15 and the rotating shaft 18a are stopped.

The rotary member 6 is connected to the rotating shaft 18 so as to ensure their unitary rotation and the rotating shaft 18 are integrally connected to the rotary member 6 by means of the fastener 21, such as screws, bolts and nuts. Typical examples of the rotary member 6 are a rotary cutter used in a grass mower and rollers used in a roller conveyor. These examples will be described in detail below:

In FIG. 1 the reference numeral 3 designates a power source 25, such as a battery, electrically connected to the motor 7 located in the driver division 2. This electrical connection ensures that the electric power involving in putting a brake on the motor 7 is stored in the battery 25.

The switch 5 is used to start and stop the motor system 1. When the switch 5 is on, a start-signal is fed to a driver division 33, thereby causing the rotary member 6 to rotate through the rotating shaft 18. When the switch is off, the rotary member 6 stops through the rotating shaft 18.

In addition to the driver division 33, the controller 10 includes a motor pulse identifier 30, a clock signal generator ("signal generator") 31, a delay pulse generator 32, a delayed-time timer 35, and a short brake timer 36. The controller 10 is electrically connected to the motor 7 and the switch 5.

The motor pulse identifier 30 receives motor pulse signals Pa, Pb or Pc fed by the Hall elements 17a, 17b or 17c, and the pulse signal P received is transferred to the delay pulse generator 32 and the driver division 33.

The signal generator 31 can generate a predetermined number of clock signals, and these signals are fed to the delay pulse generator 32. The signal generator 31, as shown in FIG. 3D, adjusts the intervals at which the clock signals are fed, which means that the number of clock signals is adjusted.

Figure 4B:
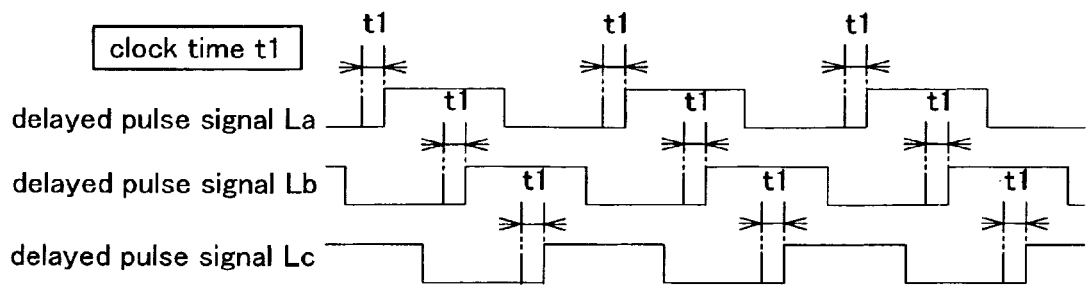
FIGS. 4B and 4C are timing diagrams showing delay signals generated in the delay pulse division at t1 and t2, respectively.
Figure 4C:
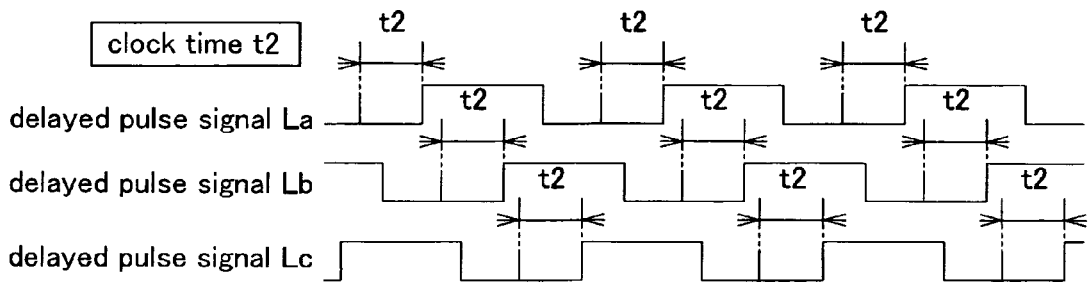

The delay pulse generator 32 operates when the motor 7 starts, and generates a pulse signal ("delayed pulse signal L") whose phase is delayed against a motor pulse signal P received from the motor pulse identifier 30. More particularly, when the delay pulse generator 32, as shown in FIG. 3A, identifies the pulse signals fed from the motor 7, the point of time when the pulse signal P is produced, as shown in FIG. 3B, is used as a basis the delay pulse signal L is produced with its phase being delayed in correspondence to one pulse fed from the signal generator 31. More particularly, as shown in FIGS. 4B and 4C, the delay pulse generator 32 produces delayed pulse signals La, Lb, and Lc with their phases being delayed in correspondence to one clock signal fed from the signal generator 31.

The driver division 33 receives motor pulse signals P fed from the motor pulse identifier 30, delay pulse signals L fed from the delay pulse generator 32, and on/off signals fed from the switch 5, and the power supply controlled in response to these pulse signals is received by the motor 7. More particularly, while the motor 7 is put into operation by turning on the switch 5, the driving signals are fed to the driver division 33. At this stage, the driver division 33 controls the electric power supplied to the coil 20 in response to the motor pulse signal P fed from the motor pulse identifier 30.

Figure 5A:
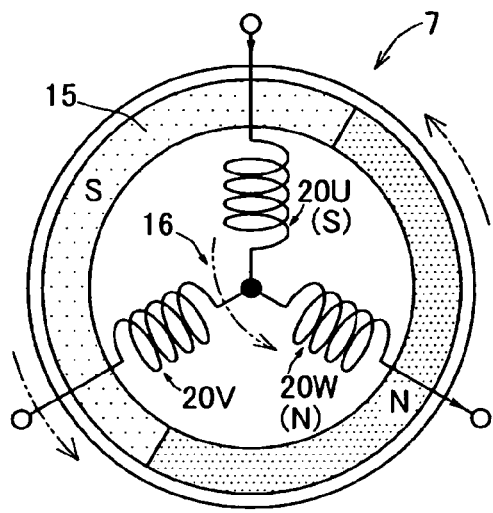
FIGS. 5A to 5D are schematic views showing various aspects of the movements of the brushless motor in the regular operation.
Figure 5B:
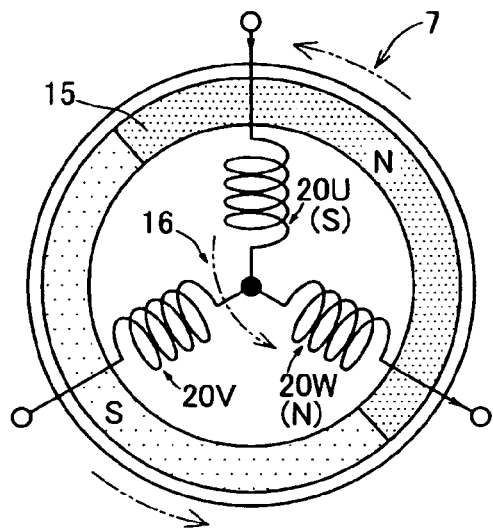
Figure 5C:
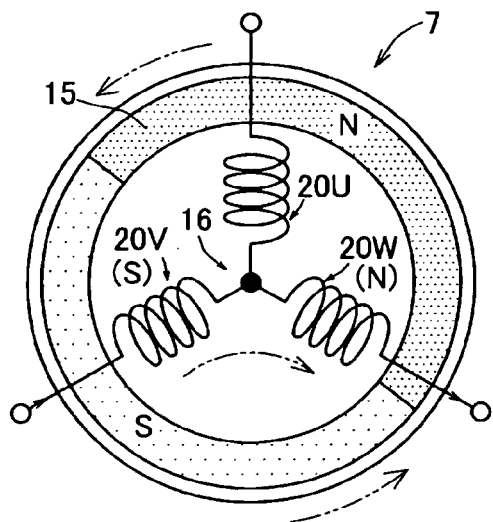
Figure 5D:
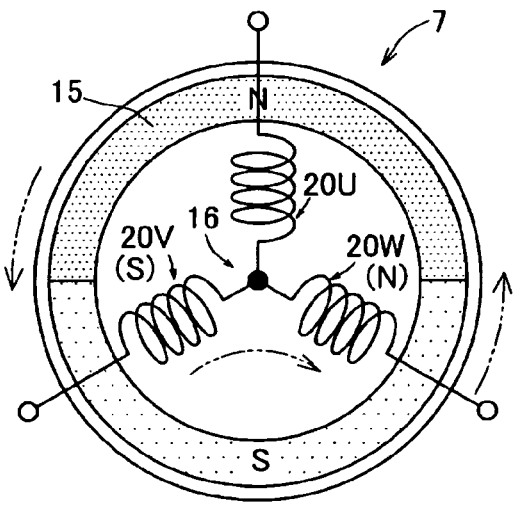

In regular operation if the poles (N and S) of the rotor 15 are found located at the places shown in FIG. 5A by the Hall elements 17a to 17c, the driver division 33 regulates the flow of electric current from the coil 20U to the coil 20W, thereby causing the rotor 15 to rotate in the direction indicated by the arrow in FIG. 5A (in the anti-clockwise direction). Subsequently, the driver division 33 switches the flow of electricity, as shown in FIG. 5C, so that the flow of electricity is changed from the coil 20V to the coil 20W. In this way, the driving coil 20W is excited to the N-pole and the driving coil 20V is excited to the S-pole. The rotor 15 is rotated anti-clockwise as shown by the arrows in FIG. 5C and FIG. 5D.

If the motor 7 is to be stopped, where the switch 5 is turned on to send a braking signal to the driver division 33, the signal generator 31 continues to feed clock signals to the delay pulse generator 32 for a given period of time from the point of time when the braking signal is fed. At the same time, the delay pulse generator 32 feeds a delay pulse signal L to the driver division 33 which, in response to the signals L, puts a brake on the rotor 15. In this way the rotor 15 is gradually and then completely stopped.

More specifically, while a braking signal is fed to the clock signal generator 31 by the switch 5 (the "on" state), the clock signal generator 31 feeds clock signals from the point of time when the generation of the braking signal starts. The clock signal generator 31 changes the number of clocks so as to prolong the time period corresponding to one clock ("clock period") at every predetermined unit-time interval. This means that after the braking signal becomes "on", the time periods T1, T2 ... Tn (n=1, 2, 3, 4 ... ) are successively set, wherein the clock periods of the clock signals fed within the time period Tn are set as tn (n=1, 2, 3, 4 ... ). Then, the following relation will be established:

$$tn > t(n-1)$$

In this way the clock signals are fed to the delay pulse generator 32 which produces the delay pulse signal L in response to the motor pulse signal P and the clock, and the delay pulse signal L is fed to the driver division 33.

After the braking signal becomes on, the delay signal L is fed to the driver division 33 which then energizes the coils 20U, 20V and 20W. As a result, the rotor 15 stops for a period of time corresponding to the delayed phase. In addition, while the braking signal is on, the clock period tn is prolonged at every unit time, thereby enlarging the delay of the phase accordingly. In this way, the rotor 15 is subjected to an increasing braking force while the unit time T passes.

While the rotor 15 stops, the driving coils 20 of the motor 7 induce electric power, which is delivered to the power source 3 where the electricity is stored in the battery 25.

The above-described braking state continues from when the braking signal becomes "on" up to when the predetermined period of time passes. In the illustrated embodiment when the braking signal becomes "on", the counting of the signals starts from the point of time, and the braking operation stops when the delayed-time timer 35 is up.

When the generation of the braking signals is finished, the driver division 33 is braked for a short time after the lapse of a predetermined period, thereby stopping the rotor 15 completely. Now, referring to FIG. 6, the sequence will be described:

At Step 1 the switch 5 of the controller 10 is turned on, and when it is recognized that the driver division 33 is energized, the sequence advances to Step 2 where the motor 7 is put into regular rotation.

Then, the sequence advances to Step 3 where the braking signal is recognized about whether it is "on" or not. If the braking signal is found to be "off" (indicated "No"), the motor 7 continues its regular operation. If it is found to be "on", the sequence advances to Step 4 where the delayed-time timer 35 and the short-brake timer 36 start their counting operations. The sequence advances to Step 5.

At Step 5 the controller 10 starts its braking operation in response to the delayed pulse signal L fed to the driver division 33 from the delay pulse generator 32.

When the braking operation starts, the coils 20U, 20V and coil W are energized at the delayed phases corresponding to one clock (time tn) fed from the signal generator 31. At this stage, the braking force gradually increases upon the rotor 15 at the intervals of time (tn), thereby causing the rotor 15 to slow down gradually.

At this stage, the sequence advances to Step 6 where the delayed-time timer 35 recognizes that the braking time is up, but if it is not yet up, the sequence advances to Step 9 where it recognizes that the driving signal is on. If the "on" state is ascertained, the sequence is returned to Step 2 where the regular operation resumes. At Step 9 if the driving signal is recognized to be "off", the sequence returns to Step 6, thereby continuing the braking operation.

Figure 6:
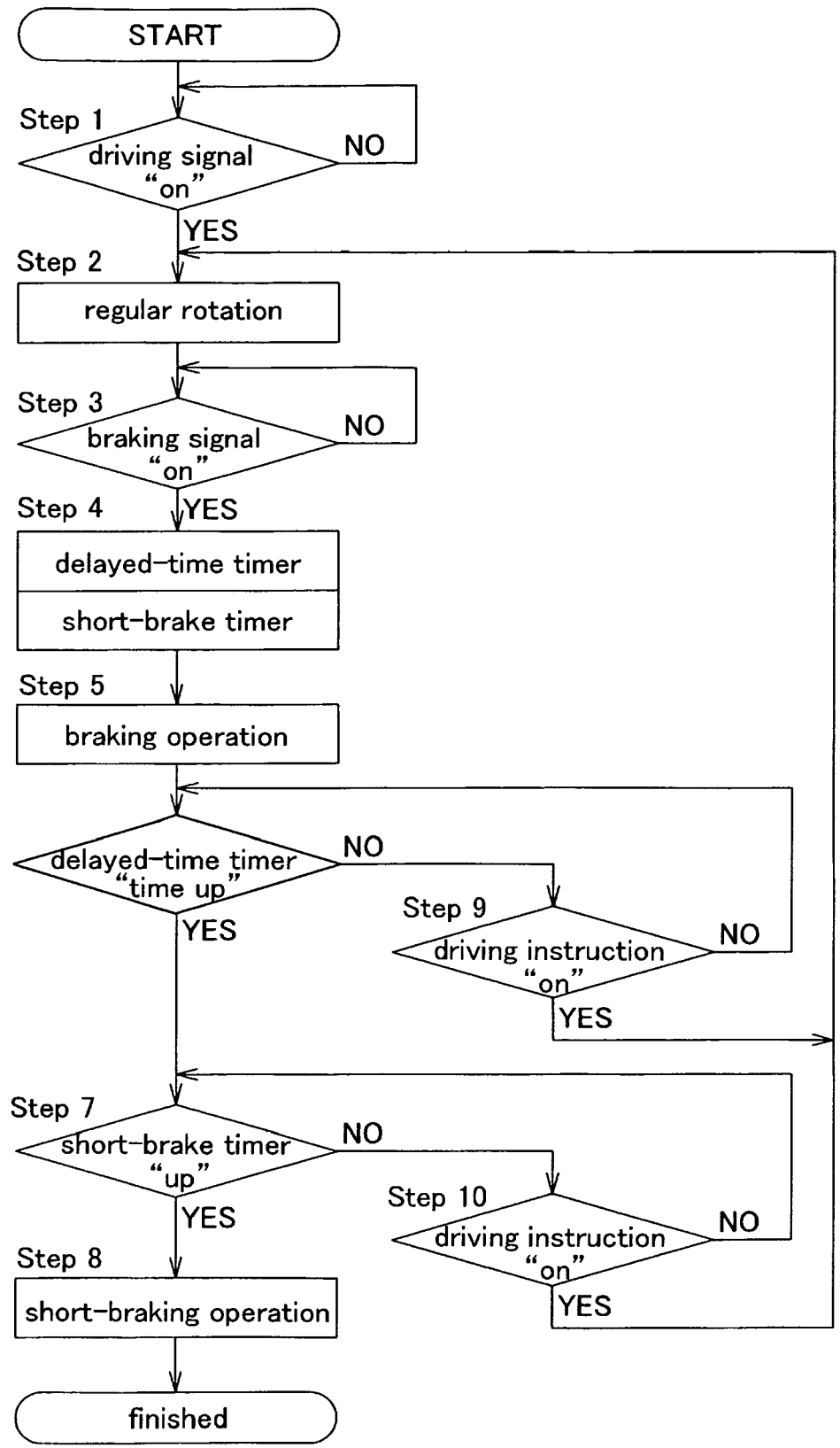
FIG. 6 is a flow chart showing the process of operation of the brushless motor of FIG. 1.

If Step 6 recognizes that the delayed-time timer 35 is up, the sequence advances to Step 7, where it is checked whether the short braking timer 36 is up or not. If it is not yet up, the sequence advances to Step 10, where the braking signal is checked for being "on" or not. If it is "on", the sequence returns to Step 2 where the regular operation resumes. On the other hand, if it is "off", the sequence returns to Step 7 where the sequence waits for the short brake timer 36 being up. When it is found to be up, the sequence advances to Step 8 where the motor 7 is braked for a short time, and then is completely stopped. In this way, the flow of sequence shown in FIG. 6 is finished.

The function of the controller 10 is to regulate the electric supply to the driving coil 20 in response to the delayed pulse L. After a brake is put on the motor 7, the phase of the delayed pulse L is progressively delayed each unit time T. This means that the braking on the rotor 15 is progressively increased, thereby bringing the rotor 15 into a gradual standstill.

The controller 10 includes the clock signal generator 31 which produces a clock signal and can produce the delayed pulse L based upon the clock signal. The clock signal produced in the clock signal generator 31 is prolonged pulse by pulse each unit time T, thereby ensuring that the delayed phase of the delayed pulse signals L fed by the generator 32 is progressively enlarged. In this way the rotor 15 gradually slow down.

As an alternative embodiment, the clock signal generator 31 can be modified so as to continue to produce a predetermined number of clock signals irrespective of the lapsing of time, and produce delayed pulse signal L whose phase is delayed by the number X of clocks against the motor pulse signal P, wherein the number X is increased with time, thereby amplifying the phasic delay of the pulse signal L.

In another alternative embodiment the number X of the clock signal generator 31 is diminished each unit time T, and at the same time, the number X is increased with time, thereby amplifying the phasic delay of the delayed pulse signal L.

In the motor system 1 of the present invention the rotary member 6 is fastened to the rotating shaft 18 by means of known fasteners 2, such as screws, bolts and nuts, but the fasteners 2 are protected from unexpected loosening due to the inertia involved in the stoppage of the motor 7.

The controller 10 of the present invention ensures that the loaded battery 25 stores the electric power induced when the motor is stopped, thereby saving electricity.

According to a further modification it is possible to continue to amplify the phase delay described above.

Instead of the Hall elements 17a to 17c, photo-transistors can be employed.

Instead of the battery 25 a known capacitor can be used.

In the embodiments described above the rotor 15 is completely stopped by putting a short brake thereon when the delay timer 35 is up after the braking signal becomes "on". The present invention is not restricted to it, but the rotating speeds of the rotor 15, the rotating shaft 18 and the rotary member 6 can be recognized by using a known rotary encoder, and when the slowing rotating speed reaches a predetermined low speed, the short brake is operated.

EXAMPLE 1

Figure 7:
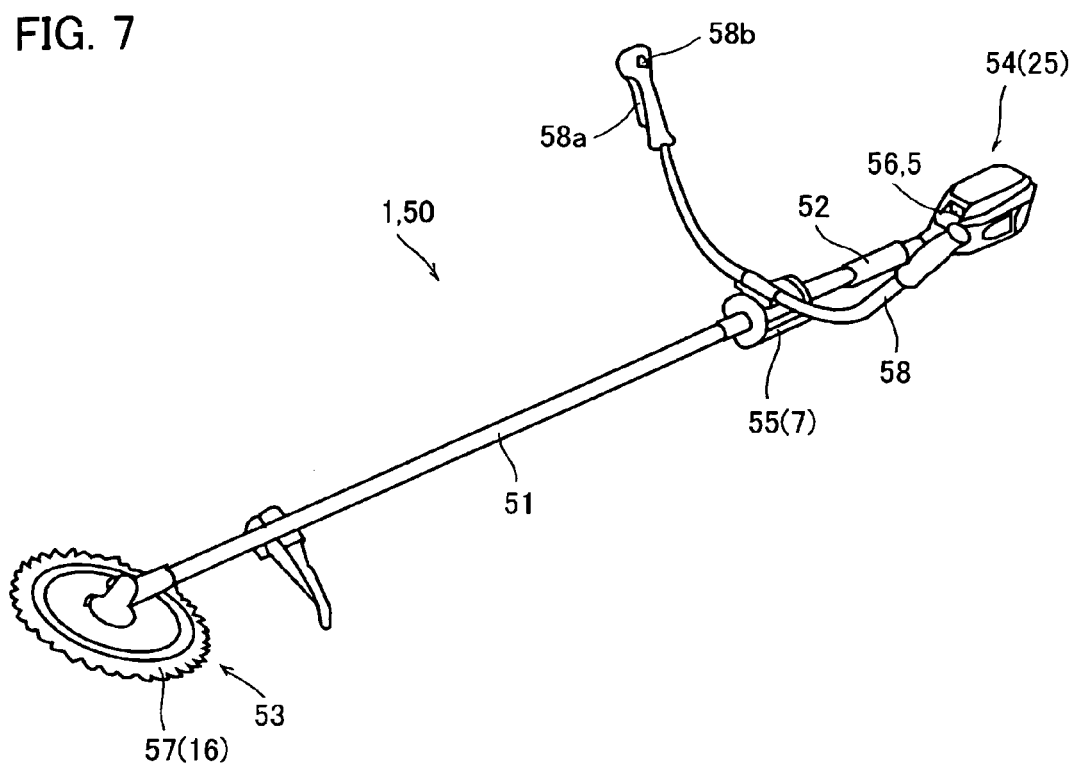
FIG. 7 is a perspective view showing the grass mower shown in FIG. 1.

FIG. 7 shows a grass mower 50 which includes the brushless motor system 1 and the brushless controller 10. The grass mower 59 is driven by the motor 7. The grass mower additionally includes a front operating lever 51 and a rear operating lever 52. The front operating lever 51 is provided with a driving division 53 which consists essentially of a rotary cutter 57. The rear operating lever 52 is provided with a power source 54 and a controller division 56. The reference numeral 55 designates a motor division.

The front operating lever 51 is hollow enough to accommodate a power transmission shaft (not shown) for connection to the driver division 53. The power transmission shaft is connected to the rotary cutter 57 through a train of bevel gears.

The motor division 55 includes the motor 7 whose rotor 15 is connected to the power transmission shaft (not shown) in the lever 51, thereby enabling the rotary cutter 57 to rotate.

The rear lever 52 is provided with an operating handle 58 having a knob 58a and a switch 58b for controlling the speed of the rotary cutter 57. The rear lever 52 is provided with a controller division 56 at the rear end, wherein the controller division 56 houses the controller 10 described above, and also another switch 5. The controller 10 and the switch 5 are electrically connected to the motor 7.

The reference numeral 54 designates a power source 54 including the battery 25, which is electrically connected to the motor 7.

The controller 10 ensures that when the rotary cutter 57 is stopped by turning on the switch 5, the rotation of the rotary cutter 57 is gradually stopped with least inertia, thereby preventing the fasteners from becoming loose.

EXAMPLE 2

Another example will be described by referring to FIG. 8, which shows a motorized-roller conveyor RS, which includes the controller 10 at one end of a spindle 75.

More particularly, the motorized roller 70 includes a roller 71 as the main body, spindles 73 and 75 carried in the roller 71, and plugs 72. The roller 71 is a tubular body of metal, and closed by the plugs 72. The spindles 73 and 75 are rotatively carried on bearings 76 and 77.

Figure 8:
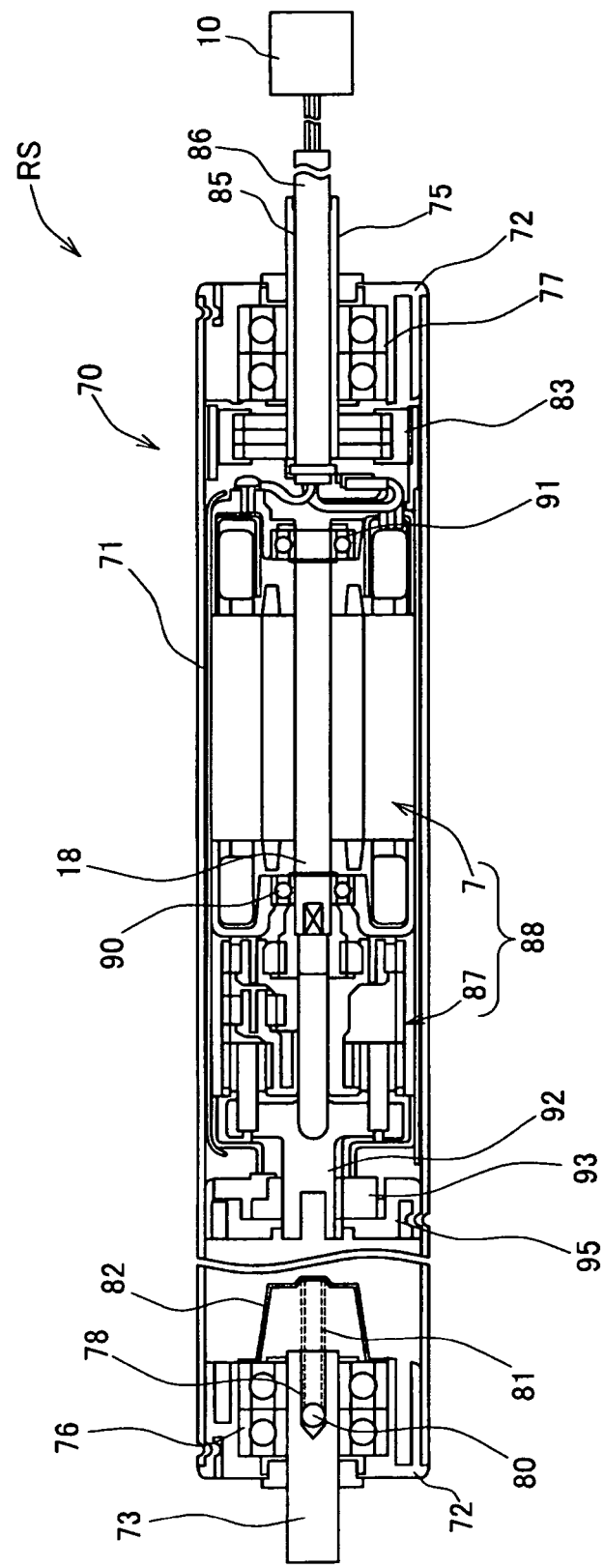
FIG. 8 is a cross-sectional view a motorized roller for a roller conveyor, the roller including the brake-controller of the present invention.
Figure 9A:
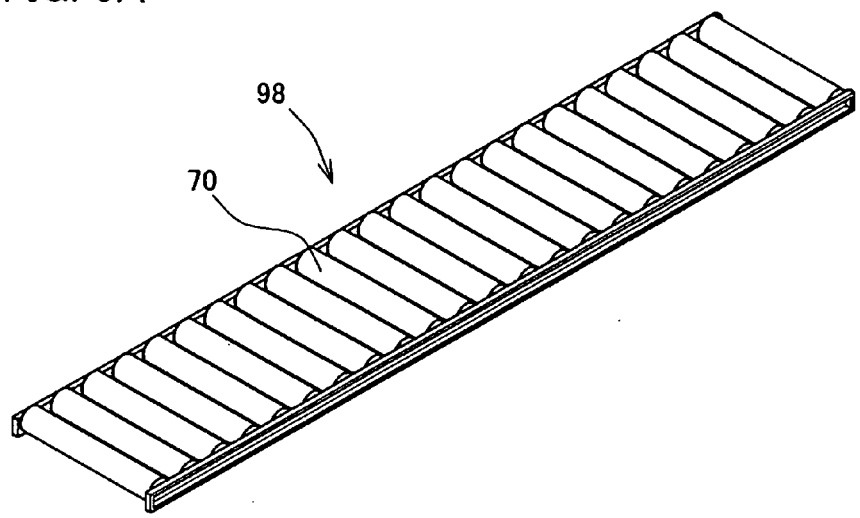
FIG. 9A is a motorized roller conveyor including the brake-controller of the present invention.

FIG. 8 and FIG. 9A show the controller 10 applied to the motorized roller conveyor 70 so as to ensure that the rotation of the roller conveyor 70 is gradually stopped with least inertia. Under the least inertia the cartons placed on the rollers are protected from falling off the conveyor even if the rollers are suddenly stopped.

EXAMPLE 3

Figure 9B:
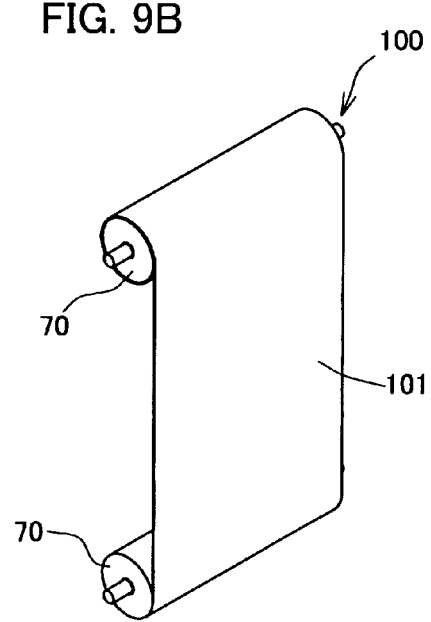
FIGS. 9B and 9C each are a display unit including a brake-controller of the present invention.
Figure 9C:
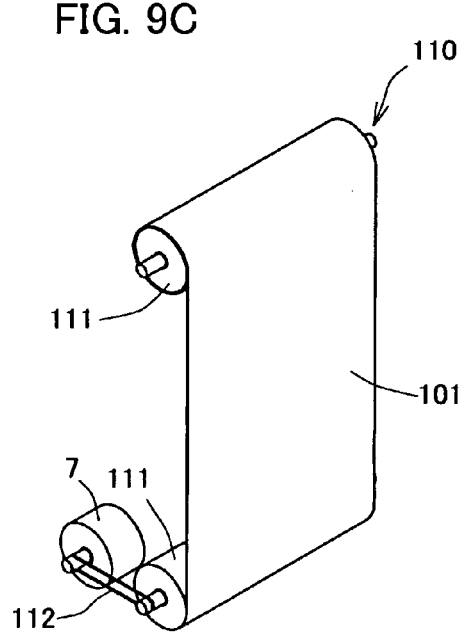

FIG. 9B shows a display unit 100 for winding up a long object 101 such as a screen, which will be more particularly described:

In addition to the screen 101, the display unit 100 includes a pair of motorized reels 70, wherein one of the reels 70 is fastened to one end of the screen 101, and the other reel 70 is fastened to the other end thereof. The screen 101 is subjected to a certain amount of tension so as to constantly hold it in a stretched manner.

The screen 101 bears an advertising phrase or the like which is displayed in slow reciprocal movement between the reels 70.

In displaying the screen 101, the loosened screen 101 looks ugly for the viewers. By providing the motors 70 with the controller 10 described above, the motors 70 can stop without inertia, thereby protecting the screen 101 from slackening which otherwise would occur at every time when the motor 70 stops.

The application of the controller 10 is not limited to the examples described above, but it can be applied in a wider range of fields where the use of a power-driven rotary member is involved.

What is claimed is:

1. A brake-controllable brushless motor, comprising:
    a rotor and a stator having polyphase coils;
    a polar position detector whereby electric power is supplied to the coil selected by its phase in response to the polar position of the rotor detected by the polar position detector;
    a driver division for controlling the electric supply to the coils;
    a motor pulse identifier for recognizing motor pulse signals fed from the polar position detector; and
    a delayed pulse generator for producing phase-delayed pulse signals in response to the pulse signals fed from the motor pulse identifier, thereby ensuring that when the brushless motor is braked, the phase-delay of the delayed pulse signals is progressively and continuously enlarged, and the coils receive controlled electric supply from the driver division in response to the delayed pulse signals.

2. The brake-controllable brushless motor of claim 1, further comprising a clock signal generator for producing a predetermined number of clock signals, whereby the delayed pulse generator produces delayed pulse signals whose phases are delayed for the motor pulses recognized by the motor pulse identifier, thereby ensuring that after the braking operation starts, the number of clock signals diminishes at every predetermined period of time.

3. The brake-controllable brushless motor of claim 1, further comprising a chargeable battery for storing the electric power induced when the brushless motor is stopped.

4. The brake-controllable brushless motor of claim 1, wherein the rotor is mechanically connected to a rotating shaft adapted for connection to a rotary member, thereby ensuring that the rotation of the rotary member is gradually stopped in response to the braking control signal.

5. The brake-controllable brushless motor of claim 4, wherein the rotary member is a rotary cutter of a grass mower.

6. The brake-controllable brushless motor of claim 4, wherein the rotary member is a roller of the roller conveyor used for carrying cartons from one place to another.

7. The brake-controllable brushless motor of claim 6, wherein the brushless motor is built in a selected number of rollers as motorized rollers.

8. The brake-controllable brushless motor of claim 4, wherein the rotary member is a pair of rollers for supporting a sheet which is reciprocally moved from one roller to the other, thereby preventing inertia from occurring when the rollers are stopped.

* * * * *